United States Patent [19]

Lanier et al.

[11] 3,938,957

[45] Feb. 17, 1976

[54] APPLICATOR CARD

[75] Inventors: Terry O. Lanier, Northboro; Eugene F. Martha, North Attleboro, both of Mass.

[73] Assignee: Corning Glass Works, Corning, N.Y.

[22] Filed: Mar. 24, 1975

[21] Appl. No.: 561,266

[52] U.S. Cl. ................ 23/259; 23/292; 73/425.4 R; 141/83; 141/102; 141/130

[51] Int. Cl.$^{2}$ ..................... G01N 1/14; G01N 31/20

[58] Field of Search ........... 23/253 R, 259, 253 TP, 23/292; 195/127; 73/425.4 R, 425.4 P; 206/223, 73; 141/83, 102, 130

[56] References Cited

UNITED STATES PATENTS

| | | | |
|---|---|---|---|
| 3,490,876 | 1/1970 | Auphan | 23/253 R |
| 3,701,633 | 10/1972 | Davis | 23/253 TP |
| 3,712,465 | 1/1973 | Deuschle | 23/292 |
| 3,776,184 | 12/1973 | Harrison | 23/253 R |
| 3,807,959 | 4/1974 | Russell et al. | 23/253 R |
| 3,859,051 | 1/1975 | Nelson | 23/253 R |

*Primary Examiner*—R. E. Serwin
*Attorney, Agent, or Firm*—Walter S. Zebrowski; Clarence R. Patty, Jr.

[57] ABSTRACT

A disposable applicator card formed of an absorbent backing, to one flat surface of which one or more compressible tubes are affixed. The tubes extend beyond one edge of the backing and are disposed so as to accept a quantity of fluid therein and thereafter to dispense at least a portion of such fluid. Means for aligning the card in connection with utilization means is also provided.

5 Claims, 1 Drawing Figure

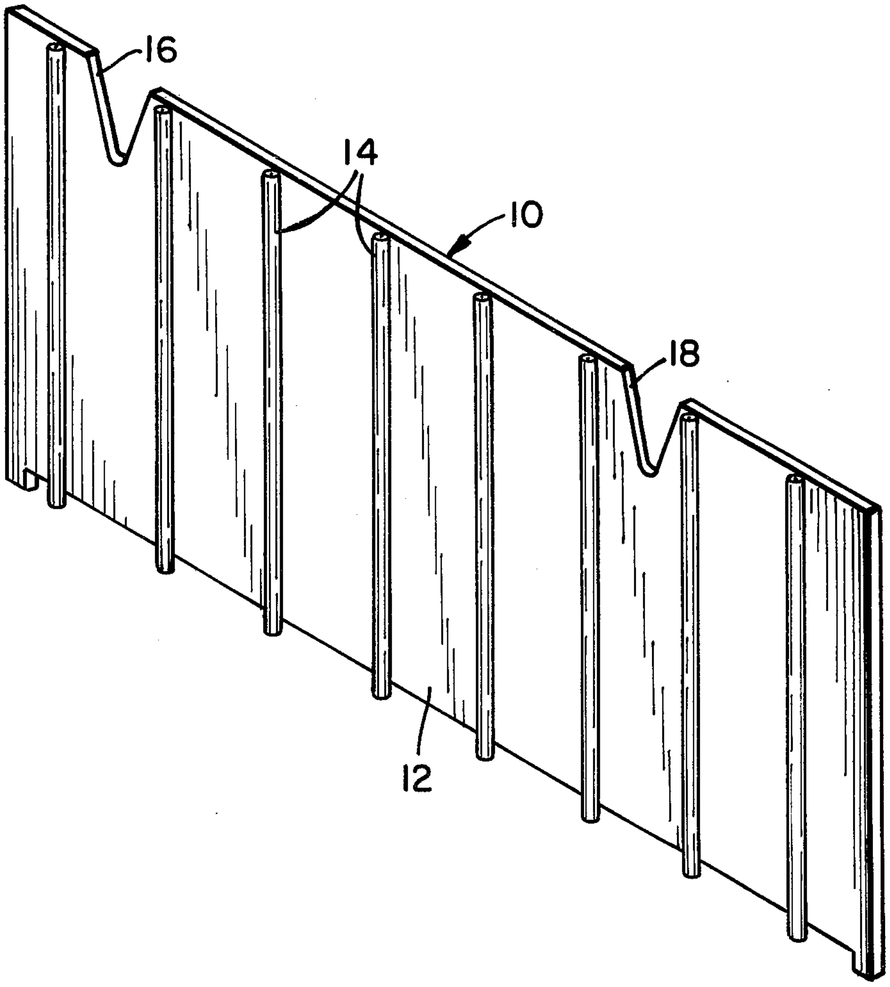
16
14
10
18
12

APPLICATOR CARD

BACKGROUND OF THE INVENTION

1. Field of the Invention

The present invention relates to disposable applicator cards but in particular to a device for dispensing a predetermined quantity of fluid for diagnostic purposes.

2. Description of the Prior Art

Heretofore dispensers of fluids for test or diagnostic purposes have been complicated syringe devices which have been costly, difficult to operate, required excessive cleaning, were susceptible to accidental contamination, and the like. Certain of such prior art dispensers were of such construction that test fluids would tend to collect about the dispensing ends whereby the predetermined quantity of test fluid would be affected. Further, such excess fluid would tend to affect the dispensing of the fluid or the application thereof on a test medium.

SUMMARY OF THE INVENTION

The objects of this invention are to provide an applicator card or a fluid dispensing means which is simple, economical, easy to use, and which overcomes the heretofore noted disadvantages.

Broadly, according to the present invention, a disposable applicator card for fluid dispensing purposes is provided. The card is formed of an absorbent backing, to one flat surface of which one or more compressible tubes are affixed. The tubes are disposed so as to accept a quantity of fluid therein by peristaltic-like action. The tubes extend beyond one edge of the backing for a distance sufficient to permit such liquid to be drawn into the tubes so that any excess fluid at the exterior portion of such extending tubes is caused to be absorbed by the absorbent backing. The card is provided with means for aligning it in connection with suitable utilization means.

Additional objects, features, and advantages of the present invention will become apparent to those skilled in the art from the following detailed description and the attached drawing on which, by way of example, only the preferred embodiment of this invention is illustrated.

BRIEF DESCRIPTION OF THE DRAWING

The single FIGURE is an oblique view of the disposable applicator card of the present invention.

DETAILED DESCRIPTION

It is to be noted that the drawing is illustrative and symbolic of the invention, and there is no intention to indicate scale or relative proportions of the elements shown therein. For the purposes of simplicity, the present invention will be described in connection with an applicator card suitable for accepting a fluid sample from a sample tray and thereafter dispensing a predetermined quantity of the fluid to a test vehicle such as an agarose gel plate, however, the present invention is in no way limited to such an application.

Referring to the drawing, there is shown a disposable applicator card or fluid dispenser 10. Applicator card 10 is formed of a semirigid absorbent backing 12 formed of paper, carboard, fiberboard, or the like. A suitable material for absorbent backing 12 is 0.030 inch thick card stock, 10 ply, with a paper sizing such as a Blanckote coating on one side. A plurality of compressible tubes 14 are disposed on one flat surface of absorbent backing 12 and affixed thereto by means of an adhesive, or the like. A suitable adhesive may be an air cure silicone rubber adhesive, or the like. As will be understood, any adhesive compatible with the tubing and absorbent backing is suitable. Compressible tubes 14 are caused to extend beyond one edge of absorbent backing 12 for a distance sufficient to permit filling with a quantity of fluid and to thereafter dispense such fluid. Suitable materials for compressible tubes 14 are natural gum rubber or plastics such as silicone rubber, or the like.

Compressible tubes 14 may be filled with a suitable test fluid through peristaltic-like action of a device such, for example, as described in U.S. patent application Ser. No. 561,267 by T. O. Lanier and E. F. Martha entitled "Fluid Dispensing Device" filed concurrently herewith, which application is expressly incorporated herein by reference. Briefly, such a device causes tubes 14 to be filled with a liquid by causing a roller to be traversed over the tubes toward the extending ends thereof so as to expel the air therein. The tubes are then immersed in reservoirs and the roller is caused to traverse toward the opposite ends causing the fluid to be drawn into the tubes by the decreased pressure effected in the tubes.

Suitable reservoirs for test fluids are disclosed in U.S. patent application Ser. No. 561,265 by T. O. Lanier entitled "Sample Tray" filed concurrently herewith, which application is expressly incorporated herein by reference.

Since the ends of the tubes extending beyond the absorbent backing are ordinarily inserted into a fluid as the tubes are being filled, a quantity of the fluid tends to collect at the end of each tube through wetting, or the like, when the tubes are removed from the reservoirs. As will be understood, such collected fluid affects the quantity of fluid which may be dispensed from the tube. In addition, such collected fluid may thereafter affect the manner of dispensing of the fluid to a test vehicle. Backing 12 being absorbent permits such excess collected fluid to be readily absorbed preventing it from affecting the quantity or the manner of dispensing of fluid.

As will be understood, if a different fluid is drawn into each respective compressible tube 14 from a separate and distinct reservoir and is thereafter dispensed onto a predetermined area of a test vehicle such as an agarose gel plate, it is imperative that compressible tubes 14 be precisely disposed with respect to the fluid reservoirs and the test vehicle. To facilitate such precise disposition of the tubes, alignment means in the form of notches 16 and 18 are provided in absorbent backing 12. Such notches permit the alignment of backing 12 with respect to the utilization device such as the dispenser of U.S. patent application Ser. No. 561,267 heretofore noted. It may also be desirable to form notches 16 and 18 eccentrically in backing 12 as shown in the drawing so as to permit the disposition of applicator card 10 in a utilization device in only one manner.

As a typical example, an absorbent backing was formed of 0.030 inch thick card stock, 10 ply, with a Blanckote coating on one side, and a pair of eccentrically disposed notches were formed in one edge thereof. Eight compressible tubes formed of silicone rubber having an interior diameter of 0.011 inch were affixed to one flat surface of the backing by means of an air cure silicone adhesive. The tubes were caused to extend beyond one edge of the backing for a distance of 0.040 inch. It was found that in using such an applicator card in conjunction with the dispenser device described in U.S. patent application Ser. No. 561,267, eight predetermined quantities of biological serum could be drawn into the eight tubes from a sample tray such as shown in U.S. patent application Ser. No. 561,265. The excess serum collected at the end of each extending portion of the compressible tubes was absorbed by the backing. A precise quantity of each serum was thereafter dispensed onto an agarose gel plate for evaluation by electrophoresis. A quantity of each serum dispensed was approximately 1 microliter in volume.

Although the present invention has been described with respect to specific details of certain embodiments thereof, it is not intended that such details be limitations upon the scope of the invention except insofar as set forth in the following claims.

I claim:

1. A disposable applicator card comprising
an absorbent backing,
alignment means cooperatively associated with said backing, and
at least one compressible tube disposed on and affixed to one surface of said absorbent backing, each said tube extending beyond one edge of said backing.

2. The disposable applicator card of claim 1 having a plurality of compressible tubes disposed substantially parallel to each other on said one surface of said absorbent backing.

3. The disposable applicator card of claim 2 wherein said plurality of compressible tubes are substantially equally spaced from one another.

4. The disposable applicator card of claim 1 wherein said alignment means comprise a pair of notches formed in the edge portion of said absorbent backing.

5. The disposable applicator card of claim 4 wherein said notches are eccentrically formed in said edge portion.

* * * * *